Sept. 10, 1929.  A. CHAMPION  1,727,808
BY-PASS AND FILTER CONNECTION
Filed May 6, 1927

Inventor
Albert Champion
By Blackmore, Spencer & Fluti-
Attorneys

Patented Sept. 10, 1929.

1,727,808

UNITED STATES PATENT OFFICE.

ALBERT CHAMPION, OF FLINT, MICHIGAN, ASSIGNOR TO A C SPARK PLUG COMPANY, OF FLINT, MICHIGAN, A COMPANY OF MICHIGAN.

BY-PASS AND FILTER CONNECTION.

Application filed May 6, 1927. Serial No. 189,346.

This invention relates to oil filters and particularly to the manner of connecting the structure embodying the by-pass valve to the filter cover.

In the past it has been customary to attach the by-pass structure to the filter cover by means of one or more bolts and by the use of a gasket between the by-pass and the filter cover. It is the object of the present invention to eliminate these bolts and gasket and to this end I cast the by-pass structure into the cover of the filter. This will effectively eliminate all leaks between the cover and by-pass structure and avoid the use of bolts and gaskets.

Preferably in casting the by-pass into the cover, allowance is made for a relatively heavy plate at the inside of the cover to serve as a reinforcing means for the cover and by-pass structure.

The invention is disclosed in the accompanying drawing in which.

Figure 1:
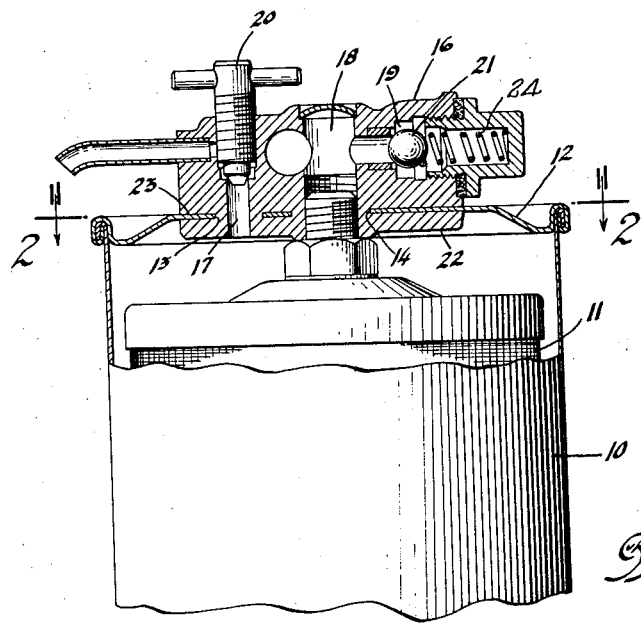
Fig. 1 is a transverse sectional view through an oil filter on the line 1—1 of Fig. 2.

Referring to the numbered parts on the drawing, 10 indicates an oil filter can, 11 the filtering material and 12 the cover thereof. The cover 12 is provided with a plurality of openings 13, 14 and 15 serving respectively as outlet, inlet and by-pass openings.

The by-pass structure of the present invention is cast into the cover and is indicated as a whole at 16 and comprises the outlet passage 17, inlet passage 18 and by-pass conduit 19. The outlet passage 17 is controlled by a valve 20 and the by-pass conduit 19 by a spring pressed ball valve 21. Any suitable form or mold may be used in the casting operation.

Figure 2:
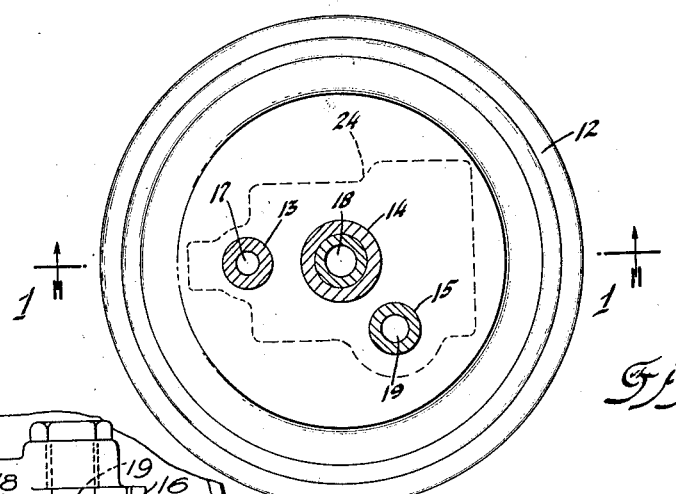
Fig. 2 is a sectional view on the line 2—2 of Fig. 1.

The general configuration of the by-pass structure is shown in dotted outline at 24 in Fig. 2 and in casting the structure into the cover, allowance is made for a relatively thick and broad inner reinforcing plate 22 which will reinforce and strengthen the cover 12. The casting of the by-pass into the cover gives a very intimate contact at the meeting surfaces as shown at 23 which results in the elimination of the usual gasket and prevents leakage.

From Figs. 1 and 2 it will be noted that the by-pass structure has a substantial portion of its area both above and below the cover 12, thereby forming a very secure connection and resulting in the elimination of all securing bolts.

Figure 3:
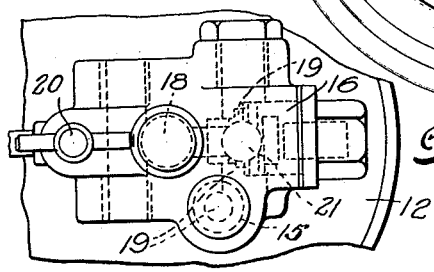
Fig. 3 is a plan view of the structure of Fig. 1.

In Fig. 3 the by-pass conduit 19 is shown in dotted outline leading from the inlet 18, past the ball valve 21 and through the opening 15 in the cover 12. This conduit permits the oil to flow to the outlet passage 17 when it cannot flow through the filter. When the back pressure of the filter exceeds the pressure of the spring 24, the ball valve 21 will be unseated and allow the oil to pass through the by-pass passage 19.

I claim:

1. In an oil filter, a cover, and a by-pass structure cast into said cover.

2. In an oil filter, a cover having a plurality of openings, and a by-pass structure cast into said openings and cover.

3. In an oil filter, a cover, a by-pass structure cast into said cover, and a reinforcing plate on the inside of said cover.

4. The structure of claim 3, said reinforcing plate being integral with said by-pass structure.

5. In an oil filter, a cover, and a by-pass structure cast into said cover, said by-pass structure having a plurality of passages.

6. In an oil filter, a cover, and a by-pass structure cast centrally into said cover.

7. In an oil filter, a cover and a by-pass structure cast into said cover and extending a substantial distance over both sides of said cover.

8. The structure of claim 7, said extensions forming the sole means for holding said by-pass on said cover.

9. In an oil filter, a cover and a by-pass structure cast into said cover and forming the sole connecting means between the cover and by-pass structure.

10. In an oil filter, a cover having a central opening and a plurality of noncentral openings, and a by-pass structure cast into said cover and openings and extending on both sides of said cover.

In testimony whereof I affix my signature.

ALBERT CHAMPION.